Sept. 18, 1951 R. B. FROST 2,568,280
PIPE PARTING TOOL
Filed Nov. 19, 1946
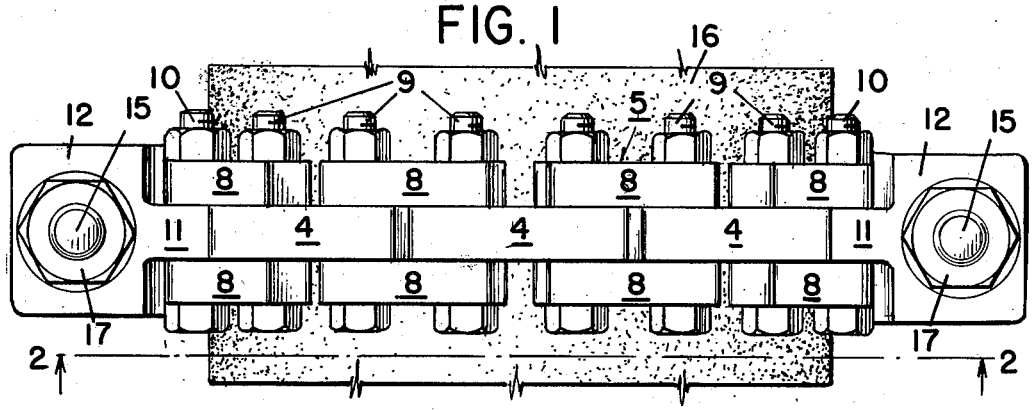
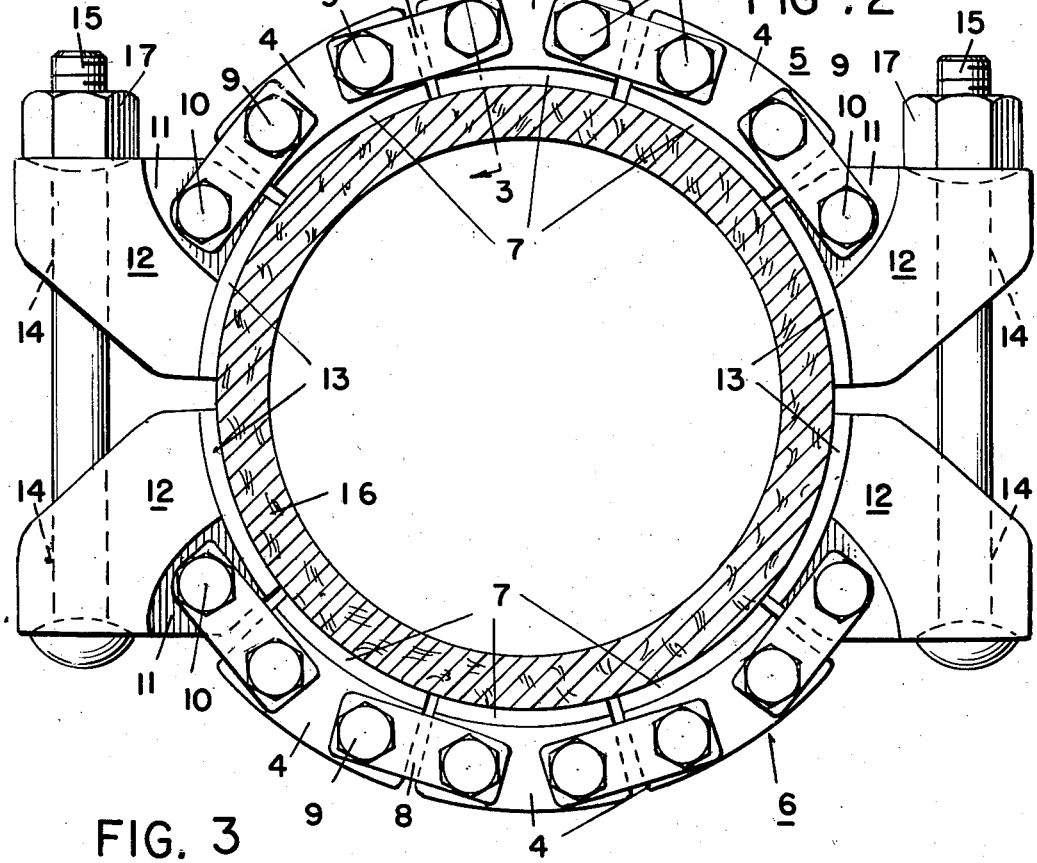
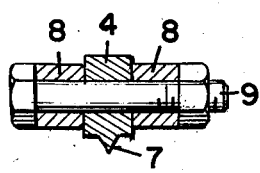
Inventor
R. B. FROST,
By Barry & Cyr.
Attorneys Patented Sept. 18, 1951

2,568,280

UNITED STATES PATENT OFFICE 2,568,280

PIPE PARTING TOOL

Raymond B. Frost, Bernardsville, N. J., assignor to Victaulic Company of America, New York, N. Y., a corporation of New Jersey Application November 19, 1946, Serial No. 710,886

3 Claims. (Cl. 30—92)

This invention relates to improvements in pipe severing tools, and more particularly to a novel pipe-parting tool for asbestos-cement pipe.

Some pipes such as those of asbestos-cement are inelastic, and consequently, fracture quite easily and, therefore, ordinary pipe severing tools cannot be employed in parting such pipe. I have discovered that by subjecting the pipe to enough radial deformation at two opposite regions on the external surface as to cause two initial fractures while restraining the direction of fracture to a plane at right angles to the axis of the pipe, the tool of the present invention successfully parts pipe to any desired length, to enable its installation in a pipe line. It will, therefore, be understood that the tool which I have invented is a fracturing and not a cut-off implement.

The primary purpose of the invention is to supply a tool especially adapted for parting asbestos-cement pipe and including chain-like sections or segments, the ends of which are connected by means capable of drawing the ends of adjacent segments toward one another to fracture the pipe in a plane perpendicular to the axis thereof.

With the foregoing object outlined and with other objects in view which will appear as the description proceeds, the invention consists in the novel features hereinafter described in detail, illustrated in the accompanying drawings, and more particularly pointed out in the appended claims In the drawings:

Fig. 1 is a top plan view of the pipe-parting tool shown arranged on a piece of pipe.

Fig. 2 is a sectional view on the line 2—2 of Fig. 1.

Fig. 3 is a cross-sectional view of the tool, taken on the line 3—3 of Fig. 2.

Referring to the drawings, 4 designates the pressure or indenting bars of sections 5 and 6. Each segment is preferably semi-circular with the bars 4 extending circumferentially and provided at the inner periphery with sharpened circumferentially extending edges or lips 7. The indenting links are arranged between connecting bars 8 and each pair of links 8 is pivotally connected to adjacent ends of a pair of indenting bars by any suitable meanas, such as bolts 9. The end links 8 of the series are pivotally connected by means of bolts 10 or the like to reduced portions 11 of terminal members 12, each provided with a circumferentially extending sharpened edge 13, at the inner periphery of the tool.

Any suitable means may be employed to move the terminals 12 of adjacent sections or segments toward one another. For example, the segments may be provided with apertures 14 for the reception of bolts 15, used for the purpose.

In using the tool, the semi-circular segments are placed upon the external surface of the pipe 16 and the bolts are employed to cause the lips 7 and 13 to bear upon the pipe in a plane perpendicular to the axis of the pipe. Upon tightening the nuts 17, the lips 7 and 13 press upon the surface of the pipe in said plane. Since the radial force of the lips acting on the pipe is greater in the region of the bolt lugs 12 and diminishes to points midway between the bolts 15, the pipe is gradually pressed out of round until a point is reached where the pipe starts to fracture at opposite sides in the regions near the inner faces of the bolt lugs. Continued tightening of the nuts 17 forces the outer end of the lips 13 of the bolt lugs deeper into the fractures, and since the pipe is held radially by the chain-like arrangement of the tool, the fractures cannot travel longitudinally or in any direction having a longitudinal component, hence they travel in the direction of least resistance, which is the plane at right angles to the axis of the pipe. The pipe finally parts when the continued tightening of the nuts 17 extends the fracture to the opposite sides midway between the bolts.

It is desirable that the distance between the outer ends of the lips 13 of the bolt lugs be kept to a small optimum value, and consequently, when fracturing different classes of a nominally sized asbestos-cement pipe, two or more arcuate segments 4 should be replaced with spare segments of the proper length to meet this condition. Since for any inside diameter size, the variation of outside diameter of machined or unmachined asbestos-cement pipe for any class or manufacture is small, a mean radius of the lips can be determined to allow one tool with the proper spare segments to take care of one nominal size.

Obviously, the tool is not limited to use on asbestos-cement pipe as it can be used for parting any pipe made of rather brittle material.

While I have disclosed what I now consider to be a preferred embodiment of the invention in such manner that the same may be readily understood by those skilled in the art, I am aware that changes may be made in the details disclosed, without departing from the spirit of the invention, as expressed in the following claims.

What I claim and desire to secure by Letters Patent is:

1. A tool for severing a frangible pipe comprising, a terminal member, a concave sharp inner edge on said terminal member, a second terminal member, a concave sharp inner edge on the second terminal member, a plurality of indenting bars arranged in an end-to-end relationship, links pivotally connecting the indenting bars to each other and the end bars to said terminal members, a concave sharp inner edge on each indenting bars aligned with the inner edges of said terminal members, a third terminal member adjacent the first terminal member, a concave sharp inner edge on the third terminal member, a fourth terminal member adjacent the second terminal member, a concave sharp inner edge on the fourth terminal member, a group of indenting bars arranged in end-to-end relationship, links pivotally connecting the indenting bars of said group to each other and the end bars thereof to the third and fourth terminal members, a concave sharp inner edge in each indenting bar of said group with the inner edges thereof aligned with the inner edges of the terminal members, means for moving the first and third terminal members toward each other, and means for moving the second and fourth terminal members toward each other.

2. A tool for fracturing pipe formed of brittle material comprising, a terminal member, a sharp arcuate inner edge on said terminal member, a second terminal member adjacent the first terminal member, a sharp arcuate inner edge on the second terminal member, a first group of indenting bars arranged in an end-to-end relationship, means pivotally connecting an end bar of said group to one of said terminal members, means pivotally connecting said indenting bars to each other, a second group of indenting bars arranged in an end-to-end relationship, means pivotally connecting an end bar of said second group to the other terminal member, means pivotally connecting the indenting bars of said second group to each other, means connecting the other end bar of the first group to the other end bar of the second group, a sharp arcuate inner edge on said indenting bars aligned with the inner edges of said terminal members, and means for moving the first and second terminal members towards each other.

3. A fracturing implement for frangible pipe comprising, a rigid terminal member having a concave sharp inner edge thereon, a second rigid terminal member having a concave sharp inner edge thereon, a plurality of indenting bars arranged in an end-to-end relationship, means pivotally connecting the indenting bars to each other and the end bars to said terminal members, a sharp inner edge on each indenting bar, a third rigid terminal member adjacent the first terminal member and having a concave sharp inner edge thereon, a fourth rigid terminal member adjacent the second rigid member having a concave sharp inner edge thereon, a group of indenting bars arranged in an end-to-end relationship, means pivotally connecting the indenting bars of said group to each other and the end bars thereof to the third and fourth terminal members, a sharp inner edge on each of the indenting bars on said group, means for moving the first and third terminal members towards each other, and means connecting the second and fourth terminal members.

RAYMOND B. FROST.

REFERENCES CITED

The following references are of record in the file of this patent:

UNITED STATES PATENTS

| Number | Name | Date |
|---|---|---|
| 1,183,158 | Auble | May 16, 1916 |
| 1,665,212 | LaMotte | Apr. 10, 1928 |

FOREIGN PATENTS

| Number | Country | Date |
|---|---|---|
| 129,639 | Germany | of Apr. 12, 1902 |